(12) United States Patent
Chang

(10) Patent No.: US 9,801,462 B2
(45) Date of Patent: Oct. 31, 2017

(54) LABORATORY TABLE ASSEMBLY SYSTEM

(71) Applicant: SAMIN SCIENCE CO., LTD., Gyeonggi-do (KR)

(72) Inventor: Hyo Cheol Chang, Incheon (KR)

( * ) Notice: Subject to any disclaimer, the term of this patent is extended or adjusted under 35 U.S.C. 154(b) by 0 days.

(21) Appl. No.: 15/302,313

(22) PCT Filed: Dec. 11, 2014

(86) PCT No.: PCT/KR2014/012186
§ 371 (c)(1),
(2) Date: Oct. 6, 2016

(87) PCT Pub. No.: WO2016/010206
PCT Pub. Date: Jan. 21, 2016

(65) Prior Publication Data
US 2017/0164728 A1 Jun. 15, 2017

(30) Foreign Application Priority Data

Jul. 16, 2014 (KR) .......................... 10-2014-0089706

(51) Int. Cl.
| | |
|---|---|
| *A47B 1/00* | (2006.01) |
| *A47B 1/08* | (2006.01) |
| *A47B 37/00* | (2006.01) |
| *A47B 13/08* | (2006.01) |
| *A47B 9/20* | (2006.01) |
| *F16B 12/30* | (2006.01) |

(52) U.S. Cl.
CPC .................. *A47B 1/08* (2013.01); *A47B 9/20* (2013.01); *A47B 13/088* (2013.01); *A47B 37/00* (2013.01); *F16B 12/30* (2013.01); *A47B 2037/005* (2013.01)

(58) Field of Classification Search
CPC . A47B 47/00; A47B 47/0008; A47B 47/0025; A47B 47/0058; A47B 47/0083; A47B 47/021; A47B 47/045
USPC .............. 108/180, 186, 187, 193, 192, 190; 312/265.1, 265.2, 257.1
See application file for complete search history.

(56) References Cited

U.S. PATENT DOCUMENTS

| | | | | |
|---|---|---|---|---|
| 2,874,708 A | * | 2/1959 | Daus, Jr. ................. | E04H 15/32 135/157 |
| 4,419,938 A | * | 12/1983 | Kaut ...................... | A47B 47/05 108/101 |
| 4,630,550 A | * | 12/1986 | Weitzman .............. | A47B 13/06 108/155 |

(Continued)

FOREIGN PATENT DOCUMENTS

| | | |
|---|---|---|
| EP | 2425748 A1 | 3/2012 |
| JP | 2002-291537 A | 10/2002 |

(Continued)

*Primary Examiner* — Jose V Chen
(74) *Attorney, Agent, or Firm* — John K. Park; Park Law Firm

(57) ABSTRACT

The present invention relates to a laboratory table assembly system capable of providing configuration diversity such that an upper surface of a table, which is used in a laboratory, is selectively adjoined and extended by another upper surface in the forward/rearward/leftward/rightward direction with regard to the existing upper surface of the table, while adjusting the height of the table in conformity with the working situation, and a shelf can be arranged on a part of the table.

3 Claims, 7 Drawing Sheets

(56) References Cited

U.S. PATENT DOCUMENTS

| | | | | |
|---|---|---|---|---|
| 5,228,762 A * | 7/1993 | Mascrier | ................ | H02B 1/01 312/265.1 |
| 5,257,794 A * | 11/1993 | Nakamura | ................ | B62B 3/00 211/182 |
| 5,451,115 A * | 9/1995 | Sayres | ................ | A47B 47/0008 403/171 |
| 5,470,139 A * | 11/1995 | Hsiao | ................ | A47B 47/005 312/111 |
| 5,590,939 A * | 1/1997 | Piontek | ................ | A47B 13/06 108/25 |
| 5,647,650 A * | 7/1997 | Daugherty | ........... | A47B 57/565 108/180 |
| 5,695,263 A * | 12/1997 | Simon | ................ | H05K 7/183 312/265.1 |
| 7,765,940 B1 * | 8/2010 | Peterson | ................ | A47B 9/00 108/144.11 |
| 7,883,288 B2 * | 2/2011 | Jorna | ................ | F16B 7/0453 403/171 |
| 8,231,185 B1 * | 7/2012 | Trusty | ................ | B65D 15/22 312/108 |
| 8,671,644 B2 * | 3/2014 | Huang | ................ | A47B 13/06 108/155 |
| 8,714,498 B2 * | 5/2014 | Ortega | ................ | A47B 13/06 108/153.1 |
| 9,206,939 B2 * | 12/2015 | Brandstrom | ............ | F16B 12/44 |
| 2001/0037988 A1 * | 11/2001 | Knab | ................ | H02B 1/01 211/189 |
| 2002/0017839 A1 * | 2/2002 | Wei | ................ | A63F 9/00 312/265.1 |
| 2012/0187814 A1 * | 7/2012 | Fryling | ................ | A47B 47/05 312/265.1 |
| 2016/0157605 A1 * | 6/2016 | Grad | ................ | A47B 47/0083 108/189 |

FOREIGN PATENT DOCUMENTS

| | | |
|---|---|---|
| KR | 10-0533522 B1 | 12/2005 |
| KR | 10-2009-0042358 A | 4/2009 |

* cited by examiner

[Fig. 1a]
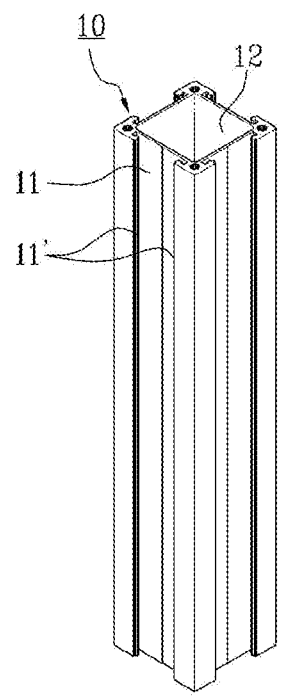
[Fig. 1b]
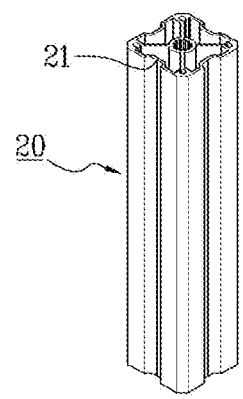
[Fig. 1c]
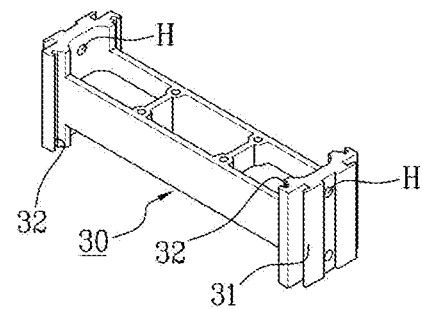

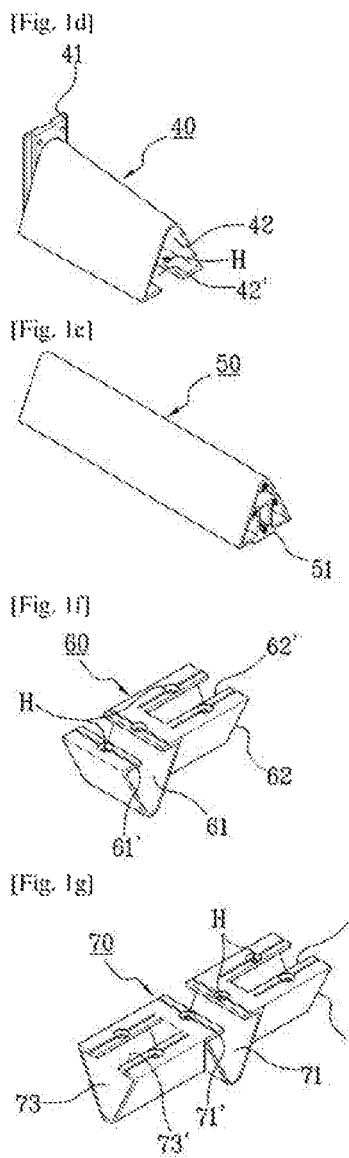

[Fig. 2a]
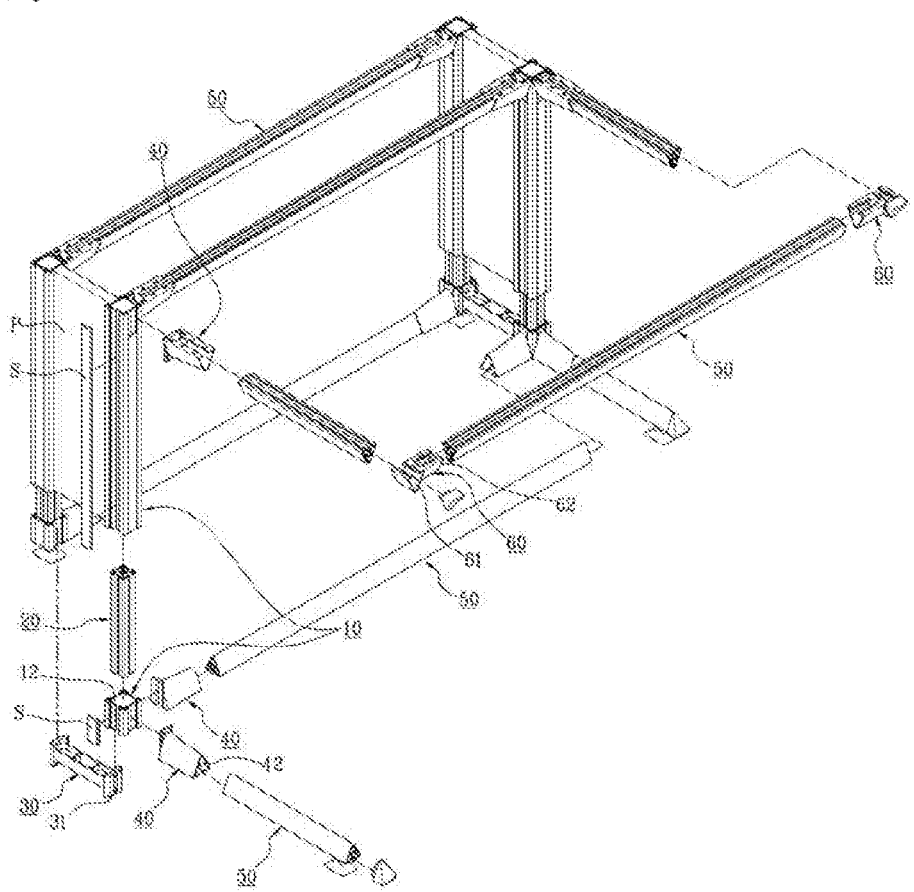

[Fig. 2b]
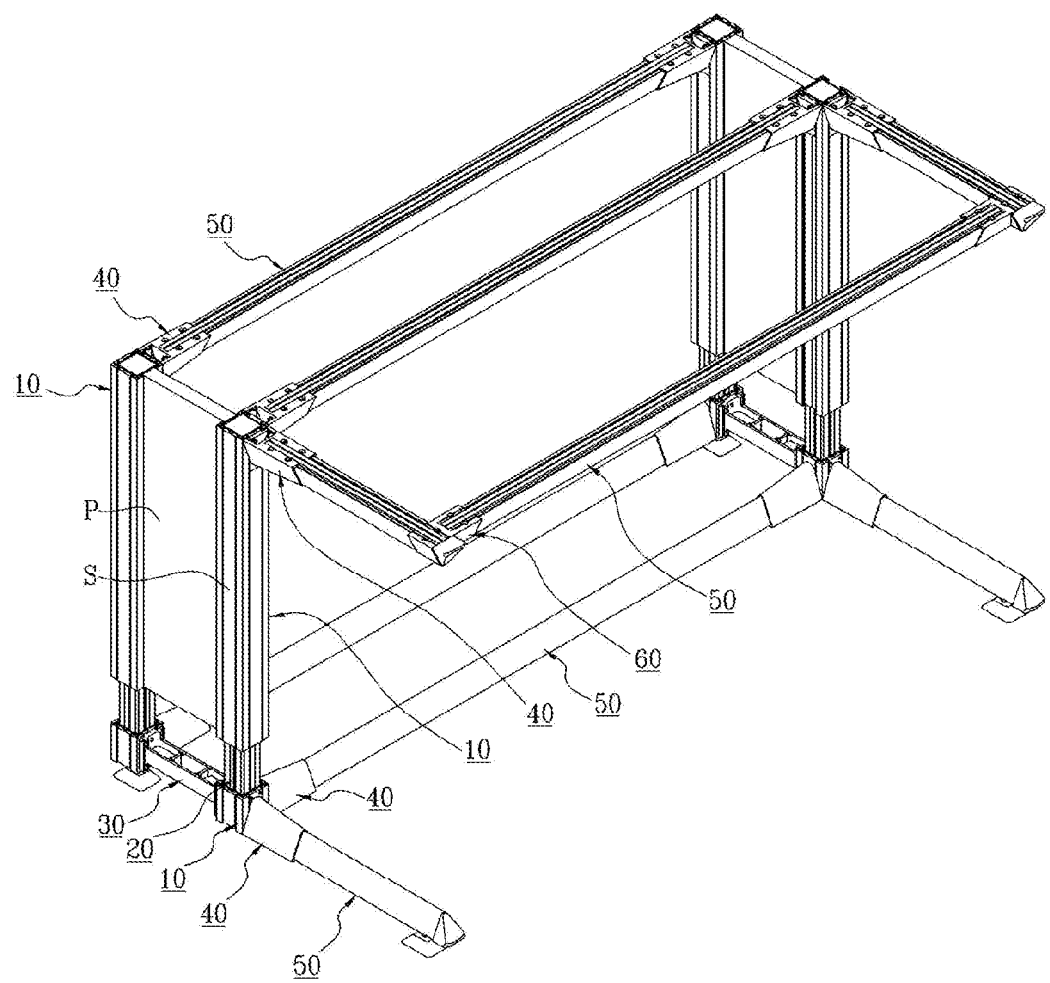

[Fig. 3a]
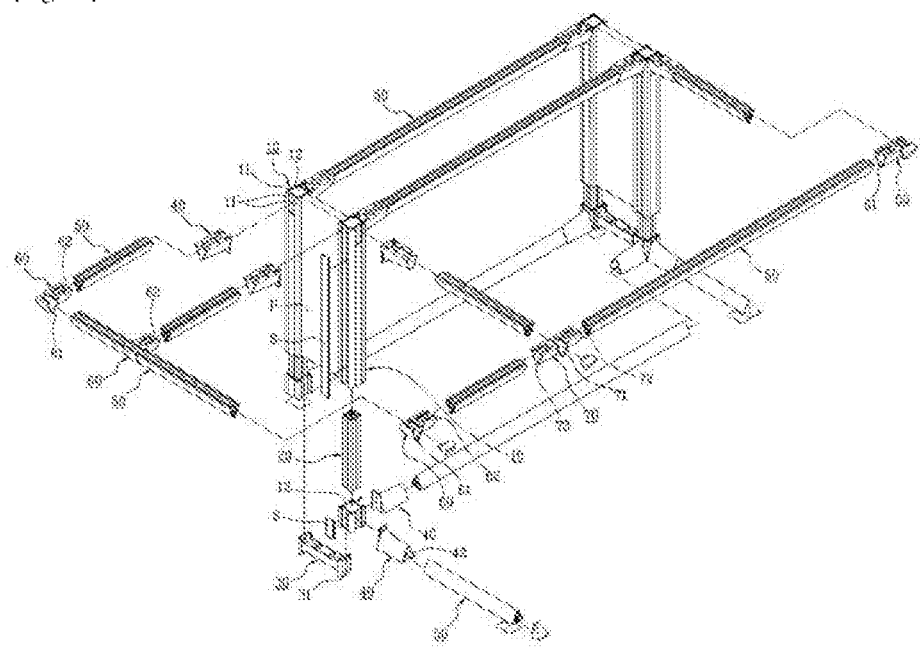
[Fig. 3b]
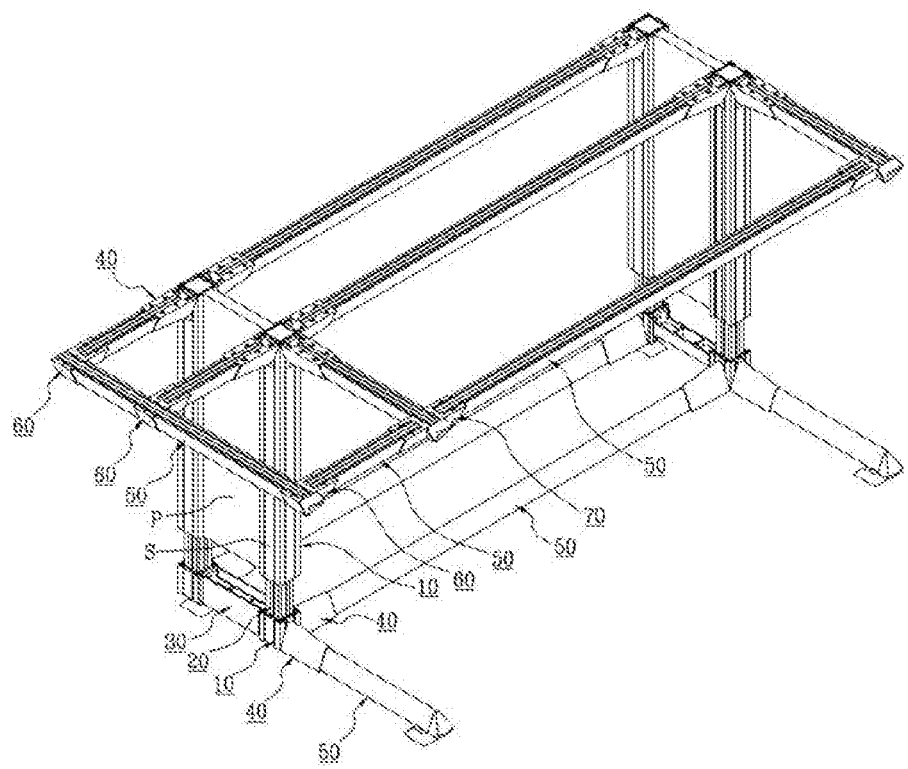

[Fig. 4]
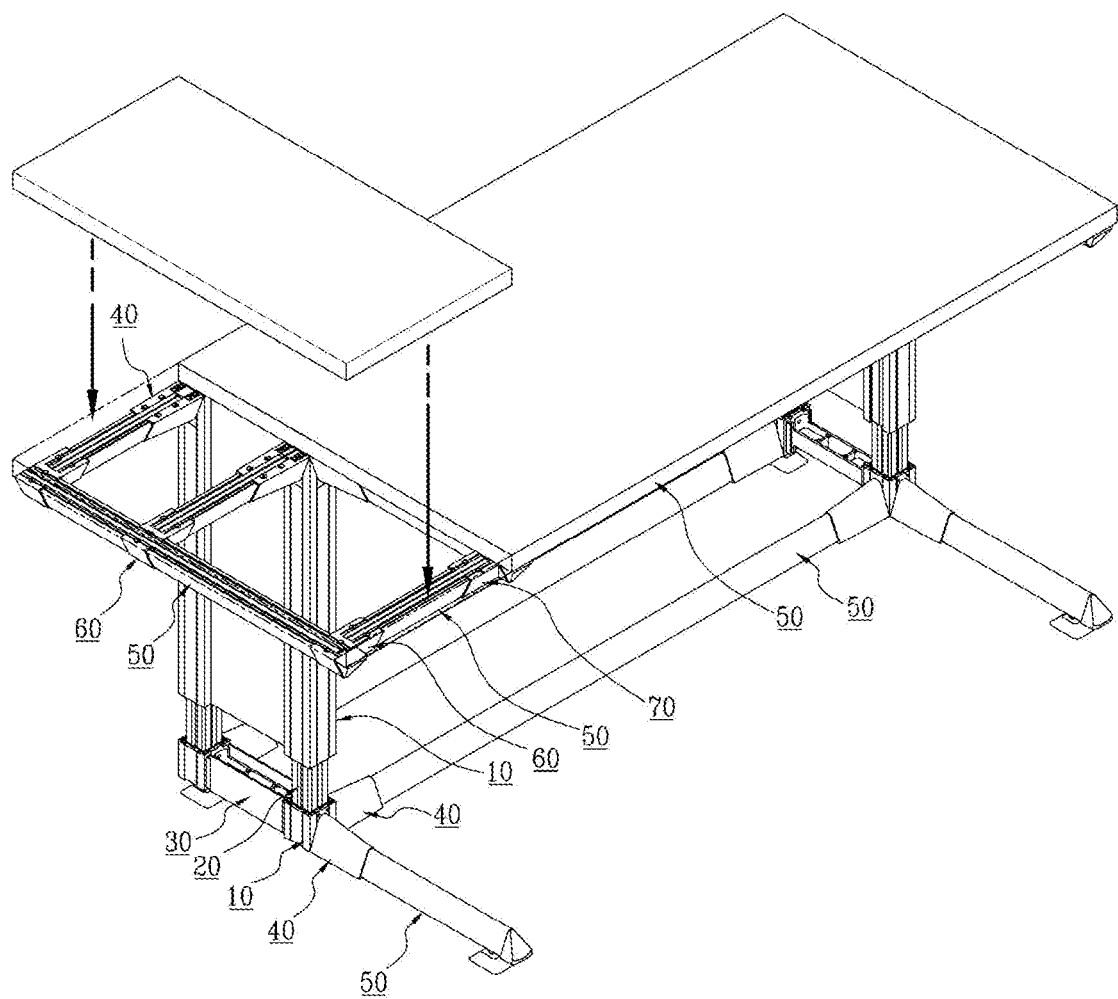

[Fig. 5]
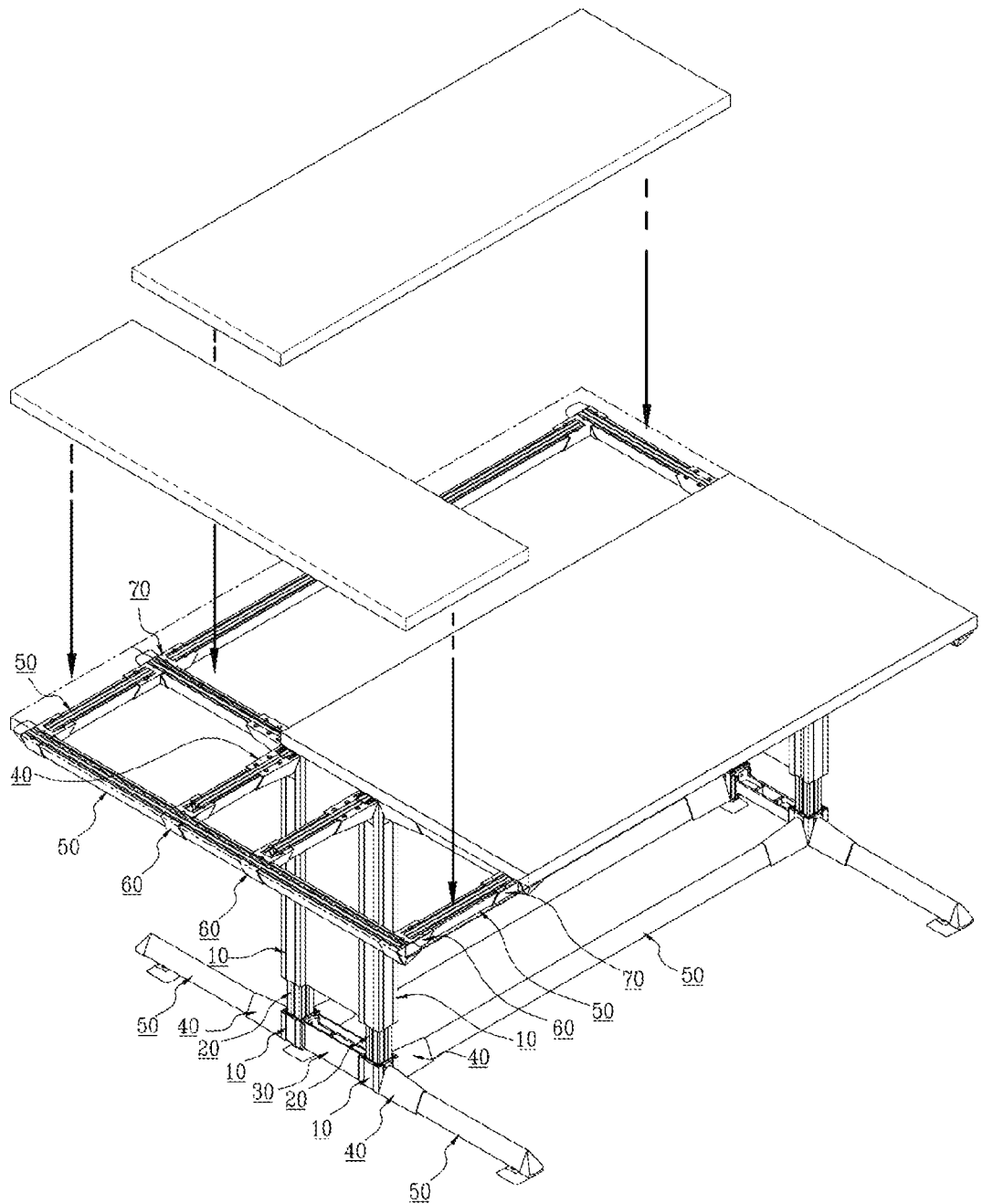

LABORATORY TABLE ASSEMBLY SYSTEM

TECHNICAL FIELD

The present invention relates generally to a laboratory table assembly system. More particularly, the present invention relates to a laboratory table assembly system configured such that an upper surface of a table is supported by a plurality of sub-frames and connection means organizationally assembled with a plurality of support frames connected to the upper surface to allow the upper surface to be movable, thereby providing configuration diversity such that an upper surface of a table, which is used in a laboratory, can be selectively adjoined and extended by another upper surface in the forward/rearward/leftward/rightward direction with regard to the existing upper surface of the table, while adjusting the height of the table in conformity with the working situation, and a shelf can be arranged on a part of the table, whereby it is possible to improve convenience in experimental work, and is possible to make better use of a space by simply varying the size and shape of the upper surface of the table.

BACKGROUND ART

In general, various kinds of furniture placed in an interior space are widely available in the form of systems furniture, which refers to a type of furniture with standardized component parts such that the furniture can be easily assembled, disassembled, and reassembled in different ways by breaking from a conventional standardized shape, thereby offering flexibility in shape and size, and improving user convenience, work efficiency, and aesthetic.

Following this trend, in the case of laboratory benches or tables, Korean Utility Model Registration No. 20-0174860 discloses "Laboratory table frame linkage structure" allowing assembly and construction thereof at a desirable location without inconvenience caused by delivery and construction of a complete product.

The laboratory table frame linkage structure disclosed in Korean Utility Model Registration No. 20-0174860 includes: a main frame laterally supporting an upper surface of the laboratory table; a welded frame supporting the main frame by being welded at a lower part of the main frame; a plurality of frames vertically and laterally mounted to the main frame, wherein the plurality of frames is connected by involving one of a three-leg joint, a four-leg joint, and a five-leg joint, and thereby it is possible to reduce logistics cost and manufacturing cost since the laboratory table can be assembled on the spot and thereby assembly time may be reduced without durability deterioration.

However, the conventional laboratory table is disadvantageous in that since the laboratory table is configured such that corners of pipes are provided in the main frame, the welded frame and the plurality of frames are simply connected by the joints, thus it is impossible to endow diversity of extending the upper surface of the table in the forward/rearward/leftward/rightward direction or adjusting the height of the table in conformity with the working situation.

Particularly, since the joint connecting each frame is in the form of the three to five-leg joint, modularization and standardization in size may not be possible, so when component parts are assembled for a laboratory bench or table, many components are required and they are structurally unsuitable for offering flexibility in shape and size of the table.

The conventional laboratory table is further disadvantageous in that since the structure thereof does not offer flexibility for improving ergonomics or efficiency, a user should endure a situation where he or she has to work for an extended period of time without being able to adjust the laboratory table for maximum ergonomics and comfort.

DISCLOSURE

Technical Problem

Accordingly, the present invention has been made keeping in mind the above problems occurring in the related art, and the present invention is intended to propose a laboratory table assembly system capable of providing structural diversity such that an upper surface of a table is selectively extended or deformed, while adjusting the height of the table in conformity with the working situation, whereby it is possible to improve convenience in experimental work, and is possible to make better use of a space by simply varying the size and shape of the upper surface of the table.

Technical Solution

In order to achieve the above object, according to one aspect of the present invention, there is provided a laboratory table assembly system including: a plurality of support frames provided to support an upper surface of the table, and each including a slot with a pair of stop protrusions and a hollow part having a quadrangular cross-section; a sub-frame locked to each of the support frames by being inserted into the hollow part of each of the support frames divided into an upper part and a lower part, the sub-frame allowing a length of the support frame to be adjusted by extent of exposure of the sub-frame; a spacer including ribs for holding a pair of the support frames provided to be in parallel and adjacent to each other at positions spaced apart from each other at a predetermined interval; a bracket including a locking groove with a rib and a cut portion, and the bracket provided perpendicular to the support frames; a connection frame provided to be engaged with the locking groove of the bracket; a corner member integrally provided with a first coupling member and a second coupling member such that the connection frame and another connection frame are connected perpendicular to each other; and a cross member including a first coupling member provided in a center of the cross member and second and third coupling members integrally provided on opposite sides of the first coupling member such that the connection frame and additional connection frames are connected to cross each other.

Advantageous Effects

According to the laboratory table assembly system of the present invention having the above-described characteristics, since the laboratory table assembly system is configured such that the height of the support frames supporting an upper surface of the table is adjusted by using a sub-frame and the size of the entire frame of the table is variable by inserting a connection frame to a bracket coupled to each of the support frames and by connecting another connection frame to a front end of the connection frame to be perpendicular to each other or to cross each other by means of a corner member or a cross member, it is possible to improve convenience in experimental work, and is possible to make better use of a space by simply varying the size and shape of the upper surface of the table in conformity with the working situation or space. The present invention is further advantageous in that elements constituting the laboratory table may be applied to furniture, such as a laboratory bench or a shelf.

DESCRIPTION OF DRAWINGS

FIGS. 1A to 1G are perspective views showing elements constituting a laboratory table assembly system of the present invention;

FIGS. 2A and 2B are a separated perspective view and an assembled perspective view showing the laboratory table assembly system according to an embodiment of the present invention;

FIGS. 3A and 3B are a separated perspective view and an assembled perspective view showing a laboratory table assembly system according to another embodiment of the present invention;

FIG. 4 is a perspective view showing an example where an upper surface is mounted in the assembled state of FIG. 3B; and FIG. 5 is an assembled perspective view showing a laboratory table assembly system according to a further embodiment of the present invention.

BEST MODE

Reference will now be made in greater detail to a laboratory table assembly system of the present invention with reference to the accompanying drawings, hereinbelow.

FIGS. 1A to 1G are perspective views showing elements constituting a laboratory table assembly system of the present invention; and FIGS. 2A and 2B are a separated perspective view and an assembled perspective view showing the laboratory table assembly system according to an embodiment of the present invention, wherein the present invention allows a table for a laboratory to be configured such that a height thereof is adjusted for use convenience, and to be configured such that an upper surface thereof is selectively extended or is deformed into a variety of shapes in consideration of a work space and ergonomics.

FIG. 1A illustrates support frames 10 that vertically support an upper surface of the table of the present invention, wherein the support frames 10 each includes: a slot 11 formed on each of four surfaces of a quadrangular support frame, with a pair of stop protrusions 11' protruding on opposed sides of the slot to face each other; and a hollow part 12 having a quadrangular cross-section.

FIG. 1B illustrates a sub-frame 20 that serves as a medium by being inserted into the hollow part 12 of the support frame when each divided support frame 10 is connected into one straight line, wherein an outer surface of the sub-frame 20 is formed with a leading groove 21 so as to be tightly fixed to the support frame by using a set screw (not shown) that is engaged from outside the support frame 10, whereby a length (a height) of the divided support frame 10 is adjusted by extent of exposure of the sub-frame 20.

It is preferred that the sub-frame 20 is formed to have a quadrangular cross-section so as to slide in the hollow part 12 of each of the support frames 10 having a quadrangular cross-section in a state where the sub-frame comes into close contact with the hollow part of each of the support frames 10 in order to prevent a gap in a joint formed when one or more divided support frames 10 are fixedly connected into one straight line.

After the sub-frame 20 is slidably inserted into the hollow part of each of the support frames 10, the support frame is tightly fixed to the leading groove 21 of the sub-frame 20 by engaging the set screw from outside the support frame 10 using a publicly known art.

FIG. 1C illustrates a spacer 30 allowing a pair of the support frames 10 that are in parallel and adjacent to each other to be held at positions spaced apart from each other at a predetermined interval, wherein each of opposite ends of the spacer 30 includes ribs 31 engaged with the stop protrusions 11' of the slots 11 of a pair of the support frames 10, and a screw hole H through which the set screw is engaged. The ribs 31 are each formed with a fixing groove 32 inside the ribs such that a panel (not shown) preventing the spacer 30 from being exposed is optionally engaged therewith.

The ribs 31 provided opposite sides of the spacer 30 are moved to a desirable location along the stop protrusions 11' provided in the slot 11 of the support frame 10, and then the spacer is locked to the support frame by being engaged with the set screw through the screw hole H, and thereby the pair of the support frames 10 provided to be in parallel and adjacent to each other is held at positions spaced apart from each other at a predetermined interval by the spacer.

FIG. 1D illustrates a bracket 40 that holds and supports the connection frame 50 and the support frame 10 when the connection frame 50 and the support frame 10 are connected to be perpendicular to each other, wherein the bracket 40 includes: a rib 41 provided at a first end of the bracket, and engaged with the stop protrusions 11' of the slot 11 to be perpendicular to the support frames 10; and a locking groove 42 with a cut portion 42' provided at a second end of the bracket.

The rib 41 and the cut portion 42' are formed with a plurality of screw holes H respectively on a side surface of the rib and on side surfaces of the cut portion so as to allow the set screw to be engaged through the hole.

FIG. 1E illustrates a connection frame 50, wherein the connection frame 50 has a cross-section corresponding to the locking groove 42 of the bracket 40 so as to be engaged with the locking groove 42, and includes a protruding portion 51 provided on a surface in a longitudinal direction so as to be engaged with the cut portion 42' provided in the locking groove 42.

Here, it is preferred that the protruding portion 51 has a surface corresponding to a surface of the cut portion 42', and the connection frame 50 has a triangular cross-section.

The connection frame 50 is engaged with the locking groove 42 after the bracket 40 is engaged with the stop protrusions 11' of the slot 11 to be perpendicular to the support frames 10 in forward/rearward/leftward/rightward directions, the support frames vertically provided in pairs at opposite ends of the table, and thereby the connection frame forms a frame of the table.

FIG. 1F illustrates a corner member 60 for allowing the connection frame 50 and another connection frame 50 to be connected perpendicular to each other, wherein the corner member 60 includes: a first coupling member 61 having a cut portion 61' on a first surface of the first coupling member for allowing the connection frame to be inserted into the cut portion 61'; and a second coupling member 62 integrally provided on a second surface of the first coupling member 61 and having a cut portion 62' for allowing another connection frame 50 to be inserted into the cut portion 62', wherein a plurality of screw holes H are formed in the periphery of each of the cut portions 61' and 62' so as to allow the set screw to be engaged through the screw holes in the state where the connection frame 50 is inserted into the corner member.

FIG. 1G illustrates a cross member 70 for allowing the connection frame 50 and additional connection frames 50 to be connected to cross each other, wherein the cross member 70 includes: a first coupling member 71 provided in a center of the cross member and having a cut portion 71' for allowing the connection frame to penetrate through the cut portion 71'; and second and third coupling members 72 and 73 integrally provided on opposite sides of the first coupling member and respectively having cut portions 72' and 73', wherein a plurality of screw holes H are formed in the periphery of each of the cut portions 71', 72', and 73' so as to allow the set screw to be engaged through the screw holes in the state where the connection frame 50 is inserted into the cross member.

In other words, the corner member 60 shown in FIG. 1F is configured such that the second coupling member 62 is provided on the second surface of the first coupling member 61 to be perpendicular to the first coupling member; and the cross member shown in FIG. 1G is configured to have the third coupling member 73 to cross the first and the second coupling members 61 and 62 of the corner member 60, and thereby a connection range of the connection frame 50 may be freely extended.

Preferably, of the elements of the laboratory table assembly system, the support frames 10, the sub-frame 20, and the connection frame 50 are made of aluminum profiles and are cut into required sizes for use; and the spacer 30, the bracket 40, the corner member 60, and the cross member 70 are formed into modularized standards through injection molding so as to be suitable for the frames, whereby processability, productivity, and assembly work may be improved.

Thus, referring to a separated perspective view and an assembled perspective view of FIGS. 2A and 2B showing the laboratory table assembly system according to an embodiment of the present invention, after each of the support frames 10 vertically supporting the laboratory table is divided into an upper part and a lower part, the sub-frame 20 locked to each of the support frames 10 by being inserted into the hollow part 12 of each of the support frames, whereby allowing a length of the support frame to be adjusted by extent of exposure of the sub-frame 20 between the upper part and the lower part of the support frame, and thus it is possible to adjust the height of the laboratory table.

The ribs 31 of the spacer 30 are engaged with the stop protrusions 11' of the slots 11 provided in each of the support frames facing each other after preparing a pair of units that are each configured such that the sub-frame 20 is connected to the support frame 10, and then the set screw is engaged through the screw holes H of the ribs 31, and thereby a pair of the support frames 10 provided to be in parallel and adjacent to each other is held at positions spaced apart from each other at a predetermined interval by the spacer.

It is preferred that the spacer 30 for allowing the pair of the support frames 10 to be held at positions spaced apart from each other at a predetermined interval is mounted to the lower part of each of the support frames 10, but additional spacers may be added to the upper part of each of the support frames.

Further, an ornamental panel P or a finishing material S may be inserted into the slots 11 between the pair of the support frames 10 so as to hide the slots 11.

The support frames 10, which support the laboratory table at, at least four locations of the laboratory table, are provided in pairs at opposite sides of the table so as to face each other, and then after the bracket 40 is mounted to the upper and lower parts of the support frame, the connection frame 50 is engaged with the locking groove 42 of the bracket, whereby a portion of the frame of the laboratory table is formed by being connected to opposite pairs of the support frames.

In the process of forming a portion of the frame of the laboratory table, as the connection frame 50 is inserted into the bracket 40 and the locking groove 42 of the bracket to be symmetrical to each of front upper and lower parts of the support frames 10, the corner member 60 is connected to a front end of the connection frame 50 protruding upward while the support frames 10 protrude forward, and another connection frame 50 is vertically connected to the connection frame by means of the corner member, and thereby the frame of the laboratory table is completed.

Here, a plurality of connection frames 50 connected to the upper parts of the support frames 10 are each configured to offer stable surface contact when the protruding portion 51 of the connection frame faces the upper surface of the table on an upper surface thereof; and a plurality of connection frames 50 connected to the lower parts of the support frames 10 are each configured to offer convenience when the protruding portion 51 of the connection frame faces bottom surface.

As shown in FIG. 2B, in the present invention, after completion of assembly of the frame of the laboratory table, the upper surface is locked to the frame by using additional coupling means in the state where the upper surface of the table (not shown) is placed on the frame, and thereby assembly of the table is completed. When wider upper surface is required, extension of the upper surface is as follows.

In other words, FIGS. 3A and 3B are a separated perspective view and an assembled perspective view showing an enlarged example of the laboratory table assembly system, wherein as shown in FIG. 3B, in the process of completion of assembly of the frame of the laboratory table, after the support frames 10 in the extension direction (in the left side in the drawings) are each provided with the bracket 40, the connection frame 50 is inserted into the locking groove 42 of the bracket such that the connection frame protrudes toward the left side of the support frames 10, and the corner member 60 is connected to a front end of the connection frame 50 protruding toward the left side of the support frames while as shown in FIG. 1G, at a location where the connection frame 50 and another connection frame 50 are connected to cross each other, another connection frame 50 is connected perpendicular to the connection frame by means of the cross member 70 having the first, the second, and the third coupling members 71, 72, and 73, whereby extension of the frame of the laboratory table is completed.

When the upper surface is seated in the extended frame of the laboratory table, as shown in a perspective view of FIG. 4 that illustrates an example where the upper surface is mounted in the frame, preferably, an additional upper surface is required for the extended area, but one upper surface may be used for the entire extended frame.

FIG. 5 is an assembled perspective view showing extension of the laboratory table, as shown in FIG. 2B, in the state where a portion of the frame of the laboratory table by forward-protrudingly connecting a plurality of connection frames 50 to two pairs of the support frames 10, after a plurality of connection frames 50 is connected to the back of the frame to be symmetrical to the plurality of connection frames 50 and a plurality of connection frames 50 is connected to the left of the frame, the upper surface (not shown) is seated in the frame, whereby it is possible to secure a space for sharing the laboratory table.

Although a preferred embodiment of the present invention has been described for illustrative purposes, those skilled in the art will appreciate that various modifications, additions and substitutions are possible, without departing from the scope and spirit of the invention as disclosed in the accompanying claims.

INDUSTRIAL APPLICABILITY

Meanwhile, the laboratory table that is extendable also means that the laboratory table may be reduced in size. Although reference was made to extension of the laboratory table in the above, as shown in FIGS. 1A to 1G, elements constituting the laboratory table may be applied to furniture, such as a laboratory bench or a shelf.

The invention claimed is:

1. A laboratory table assembly system comprising:
support frames (10) provided to vertically support an upper surface of the table at, at least four locations of the upper surface, and the support frames each including: a slot (11) formed on each of four surfaces of the support frame, with a pair of stop protrusions (11') protruding on opposed sides of the slot to face each other; and a hollow part (12) having a quadrangular cross-section;
a sub-frame (20) locked to each of the support frames (10) by being inserted into the hollow part (12) of each of the support frames divided into an upper part and a lower part, the sub-frame allowing a length of the support frame adjusted by extent of exposure of the sub-frame between the upper part and the lower part of the support frame;
a spacer (30) including ribs (31) engaged with the stop protrusions (11') of the slots (11) of a pair of the support frames (10) provided in parallel and adjacent to each other, such that the pair of the support frames (10), each of which engaging with a corresponding rib (31) of the spacer (30) at a corresponding stop protrusion (11'), is held at positions spaced apart from each other at a predetermined interval by the spacer;
a bracket (40) including: a rib (41) provided at a first end of the bracket, and engaged with the stop protrusions (11') of the slot (11) perpendicularly to the support frames (10); and a locking groove (42) with a cut portion (42') provided at a second end of the bracket;
a connection frame (50) having a cross-section corresponding to the locking groove (42) of the bracket (40) removably engaged with the locking groove (42), and including a protruding portion (51) provided on a surface in a longitudinal direction removably engaged with the cut portion (42') provided in the locking groove (42);
a corner member (60) including: a first coupling member (61) having a cut portion (61') on a first surface of the first coupling member for allowing the connection frame inserted into the cut portion (61'); and a second coupling member (62) integrally provided on a second surface of the first coupling member (61) and having a cut portion (62') for allowing another connection frame (50) inserted into the cut portion (62'), such that the connection frames (50) are connected perpendicular to each other; and
a cross member (70) including: a first coupling member (71) provided in a center of the cross member and having a cut portion (71') for allowing the connection frame to penetrate through the cut portion (71'); and second and third coupling members (72 and 73) integrally provided on opposite sides of the first coupling member and respectively having cut portions (72' and 73') for allowing additional connection frames inserted into the cut portions (72' and 73') in a cross direction to the first coupling member, such that the connection frame (50) and the additional connection frames (50) are connected to cross each other.

2. The laboratory table assembly system of claim 1, wherein
the sub-frame (20) has a quadrangular cross-section so as to slide in the hollow part (12) of each of the support frames (10) having a quadrangular cross-section.

3. The laboratory table assembly system of claim 1, wherein
the support frames (10), the sub-frame (20), and the connection frame (50) are made of aluminum profiles and are cut into required sizes for use; and
the spacer (30), the bracket (40), the corner member (60), and the cross member (70) are formed into modularized standards through injection molding suitably for the frames.

* * * * *